Oct. 25, 1966     L. EDGE     3,281,165

BUSINESS BONUS CARD

Filed Aug. 28, 1962

INVENTOR.
LEONARD EDGE

BY Arthur H. Seidel

ATTORNEY

United States Patent Office 3,281,165
Patented Oct. 25, 1966

3,281,165
BUSINESS BONUS CARD
Leonard Edge, Norristown, Pa., assignor to Spot-O-Gold Corporation, Philadelphia, Pa., a corporation of Pennsylvania
Filed Aug. 28, 1962, Ser. No. 219,918
1 Claim. (Cl. 283—6)

This invention relates to a business bonus card adapted to be utilized by supermarkets, race tracks, movie theaters, and other business establishments desiring to induce steady and repetitive business.

The business bonus card of the present invention is adapted to be utilized by business establishments as an inducement to obtain steady and repetitive business in the same manner that trading stamps are utilized. The business bonus card of the present invention is neither a lottery nor a method of doing business. The card is provided with printed areas which will be punched by an operator at the business establishment. In a preferred embodiment of the present invention, the card is provided with two different types of areas to be puched.

The preferred embodiment of the present invention includes a first area which may be punched by an operator of the business establishment. The first area is preferably a plurality of small sections having numerals of different denominations indicated thereon. The numerals total to an amount which is arbitrarily selected, such as One Hundred Dollars. Each time a purchase is made, various sections are punched so as to correspond with the dollar value of the sales.

In the preferred embodiment, the card is also provided with a second area comprising a rectangle divided into an arbitrary number of sections, such as twelve. Each section is provided with a number designating a week, such as first week, second week, third week, etc.

On a front face of the business card, a numeral is printed indicating a cash bonus to be received when either the first or second areas are completely punched. The numeral designating the cash bonus is obscured by a metal layer such as gold or bronze. The bronze layer may be applied by spraying powdered bronze onto the card. The gold layer may be applied by way of roll on a hot press embossing machine. Each of the different types of metal layers may be removed by erasing the same. Erasing the metal layer does not effect the printed numeral therebelow on the business card. If the metal layer is erased, the card is immediately smudged during the erasing process thereby indicating that someone has attempted to ascertain the dollar value of the numeral printed below the metal layer.

It is an object of the present invention to provide a novel business card and method for producing the same.

It is another object of the present invention to provide a novel business bonus card having an obscured numeral printed thereon indicating the amount of a cash bonus to be paid to a customer as a result of a predetermined amount of punched areas on the business card.

It is another object of the present invention to provide a business bonus card having a cash bonus numeral printed thereon and obscured in a tamperproof manner and yet capable of being visually observed by merely erasing a metal layer applied to the card.

Other objects will appear hereinafter.

For the purpose of illustrating the invention there is shown in the drawings forms which are presently preferred; it being understood, however, that this invention is not limited to the precise arrangements and instrumentalities shown.

Figure 1:
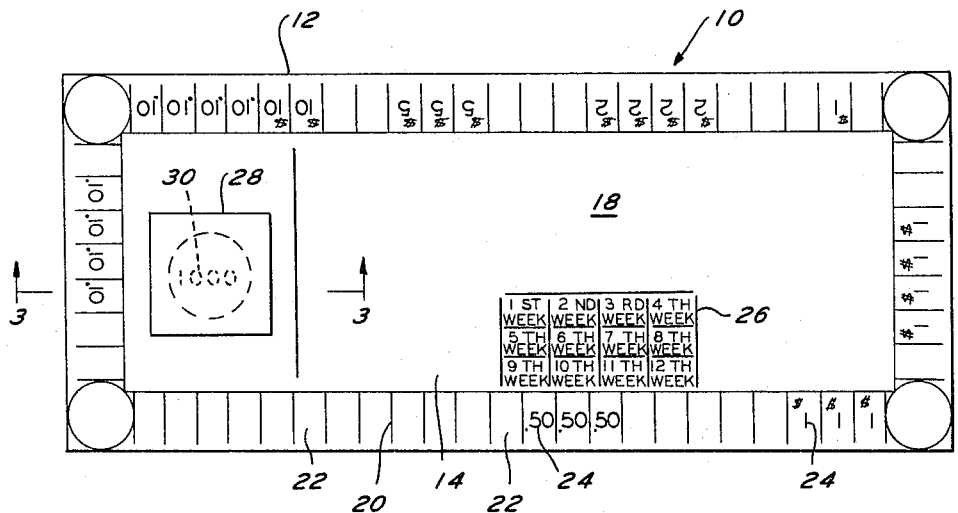
FIGURE 1 is a top plan view of the business card of the present invention.
Figure 2:
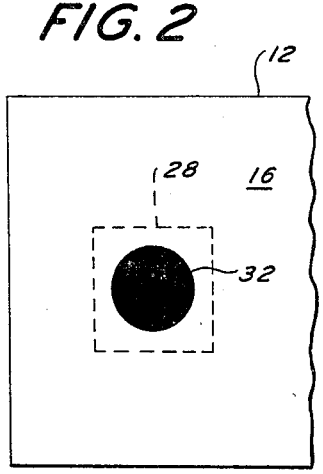
FIGURE 2 is a partial bottom plan view of the card illustrated in FIGURE 1.
Figure 3:
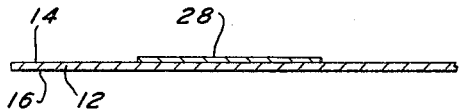
FIGURE 3 is a sectional view taken along lines 3—3 in FIGURE 1.

Referring to the drawing in detail, wherein like numerals indicate like elements, there is shown in FIGURE 1 a business bonus card designated generally as 10. The business bonus card 10 is in the nature of a rectangular card comprising a layer 12 of paper or the like.

The layer 12 is provided with a front face 14 and a rear face 16. The front face 14 is provided with an area 18 on which varying types of information will be printed. Such varying types of information will include a designation such as profit sharing bonus card, easy money bonus card, etc., the name of the business establishment, lines for the name and address of the customer, directions as to how the card is to be used, etc.

The peripheral edge of the card 10 is provided with a plurality of spaced division lines 20 on the front face 14. Each of the division lines 20 are perpendicular to the juxtaposed edge of the card 10. The division lines 20 divide the peripheral edge portion of the front face 14 into a plurality of areas 22. Each area 22 will have printed thereon a numeral 24 corresponding to various monetary denominations. The particular monetary denominations printed in the areas 22 will total One Hundred Dollars or any other arbitrary figure.

The front face 14 of the card 10 is provided with a rectangle 26. The rectangle 26 is divided into an arbitrary number of sections on which are imprinted information relating to a sequential pattern. For example, rectangle 26 is divided into twelve sections with each section designated as first week, second week, third week, etc.

On the front face 14 of card 10, at the lefthand end of the illustrated embodiment, there is provided a numeral 30 imprinted thereon and designating the amount of the cash bonus. The numeral 30 is obscured from view by a tamperproof layer of metal 28. The layer of metal 28 may be applied to the front face 14 by spraying bronze powder thereon. Alternatively, the layer of metal 28 may be goldleaf foil applied to the front face 14 by way of a roll on a hot press embossing machine. When the layer of metal 28 is applied in this manner, it may be easily removed to enable one to ascertain the amount of the numeral 30. However, when the metal layer 28 is erased, it smudges the entire area, thereby rendering it clear that someone has tampered with the card 10.

A large spot 32, or other configuration, is imprinted on the rear face 16 of the card 10. The size of the spot 32 is larger than the size of the numeral 30. The spot 32 is applied to the rear face 16 in a position so that the numeral 30 is between the spot 32 and the layer of metal 28. The spot 32 is preferably a dark colored ink thereby rendering the area of the numeral 30 opaque.

The business bonus card 10 of the present invention is utilized as follows:

Let it be assumed that the business bonus card 10 is to be used by a chain of supermarkets. The name of the supermarket chain, instructions, etc., will be applied in the area 18 on the front face 14. A numeral 30 designating the amount of the cash bonus will be imprinted on the front face 14 and obscured by the layer of metal 28. The cards will be given out to customers free of charge.

The supermarket will punch the numerals 24 in the areas 22 in an amount equal to the dollar volume of business transacted with the customer. When the customer has all of the numerals 24 punched out by the supermarket employee, the manager will remove the layer of metal 28 by erasing the same. Thereafter, the customer will be paid in cash a dollar value equivalent to the numeral 30. As illustrated, the numeral 30 designates One Thousand Dollars.

Alternatively, the employee of the supermarket may also punch the sections of rectangle 26 each time the customer transacts business with the supermarket. Hence, the customer must transact some business with the supermarket every week for a total of twelve consecutive weeks when the card has twelve sections as illustrated. Upon completion of each of the twelve sections in rectangle 26 being punched out, the supermarket employee will then erase the layer of metal 28 and pay the customer the designated cash bonus corresponding to numeral 30.

For certain types of business establishments, the use of a plurality of sections to be punched and corresponding with consecutive weeks is more suitable than the punching of numerals 24 which accumulate to an arbitrary dollar volume of business, and vice versa. For other business establishments, both of the numerical schemes may be utilized. If both schemes as illustrated in FIGURE 1 are utilized, the business establishment will pay the cash bonus value corresponding to numeral 30 upon completion of punching the sections of rectangle 26 or the areas 22, whichever occurs first. In this manner, a customer has a choice of transacting business every week for a period of twelve consecutive weeks or transacting One Hundred Dollars worth of business in a period of less than twelve weeks.

After a customer has been paid a cash bonus corresponding to the numeral 30, a particular card 10 will be stamped void and the customer will sign his name and address thereon indicating that payment has been received. Thereafter, the card 10 will be filed for accounting purposes. The customer may then have a new card 10 which will be a different color from the previous card so that some customers will be working on their second card while others will be on their first or third cards. If the color of the first set of cards issued is white and the color of the second set of cards issued is green, the first week of the green cards may correspond with the fifth week of the white cards for example.

The layer of metal 28 is extremely thin. In actual practice, when using bronze or gold, the layer of metal 28 has a thickness slightly greater than the thickness of printed indicia as obtained by conventional printing methods. As a result of the gold embossing or sprayed bronze powder, the layer of metal 28 is bonded to the front face 14 in a manner which is tamperproof. If other methods of applying the layer of metal 28 are utilized, such as adhesive, the adhesive may be steamed off and the layer replaced without giving any indication that the card had been tampered with. Of course, if a card has been tampered with, it would be immediately rejected by the business establishment.

The present invention may be embodied in other specific forms without departing from the spirit or essential attributes thereof and, accordingly, reference should be made to the appended claims, rather than to the foregoing specification as indicating the scope of the invention.

I claim:

A business bonus card comprising a layer of paper-like material having a front face and a rear face, means on said layer of paper-like material for providing a record indicative of the occurrence of a plurality of business transactions, indicia on one of said faces, and a thin layer of metal bonded directly to said one face obscuring said indicia and capable of being erased to enable the denomination of said indicia to be ascertained.

References Cited by the Examiner

UNITED STATES PATENTS

| | | | |
|---|---|---|---|
| 2,109,603 | 3/1938 | Worth | 283—6 X |
| 2,961,777 | 11/1960 | Neville et al. | 35—9 |
| 2,986,820 | 6/1961 | Neville et al. | 283—6 X |
| 2,999,698 | 9/1961 | Hoese | 283—6 |

OTHER REFERENCES

Washington Post, page C8, May 31, 1962.
Trouble Shooter Trainer Tester, copyright 1954.

LAWRENCE CHARLES, *Primary Examiner.*